Sept. 1, 1931.  G. A. BURNHAM  1,821,203

MULTIPHASE ELECTRICAL GENERATING AND SWITCHING SYSTEM

Filed Feb. 6, 1928

Inventor,
George G. Burnham

Patented Sept. 1, 1931

1,821,203

UNITED STATES PATENT OFFICE

GEORGE A. BURNHAM, OF SAUGUS, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

MULTIPHASE ELECTRICAL GENERATING AND SWITCHING SYSTEM

Application filed February 6, 1928. Serial No. 252,184.

This invention relates to multi-phase electrical generation and distribution systems and methods.

In a multi-phase high tension generation and distribution system, the phase conductors are usually extended from the generator to a bus structure or the equivalent where branch circuits are supplied through circuit breakers. The bus structure may or may not be enclosed. Ordinarily there is no overload circuit breaker in the bus structure between the branch circuit breakers and the generator although there may be a disconnecting switch between the generator and the phase conductors which switch, however, is not adapted to be opened under load.

As a result of the absence of a protective circuit breaker between the generator and the phase conductors a short circuit between the generator and the branch circuit breakers can cause a vast amount of damage since there is no convenient way of interrupting the power on the bus structure. It is, of course, possible but for many reasons undesirable to place a circuit breaker in the phase conductors between the generator and the bus structure, one reason being the relatively enormous amount of power that the circuit breaker might be called upon to handle.

I have discovered, however, that it is possible to associate a protective circuit breaker with a multi-phase generator and the phase conductors extended therefrom in such a way that the power which must be interrupted in the circuit breaker is materially reduced over that heretofore necessary; also, that the number of terminals of the circuit breaker and consequently the cost thereof can be materially reduced over that heretofore necessary, and these constitute objects of the present invention.

A further object of the invention is the provision of a generating and distributing system including a star-connected multiphase alternating current generator connected with the usual phase conductors wherein the common connection between the windings of the various phases is made through a circuit breaker which is adapted to open and break the interconnection between the phase windings, thus to interrupt the power in the phase conductors.

A further object of the invention is the method of interrupting the power in the multi-phase conductors of distribution systems supplied with power from a multi-phase alternating current generator having star-connected phase windings, which method consists in breaking the interconnections between the generator widings.

Another object of the invention is a multi-phase electric generating and distributing system wherein the power in the system is interrupted by an electric switch having one terminal per phase, each terminal being connected with a phase winding of the generator and adapted to control the interconnection between the generator windings.

A further object of the invention is generally to improve upon multi-phase alternating current, generating and distributing systems, methods and apparatus.

Figure 1:
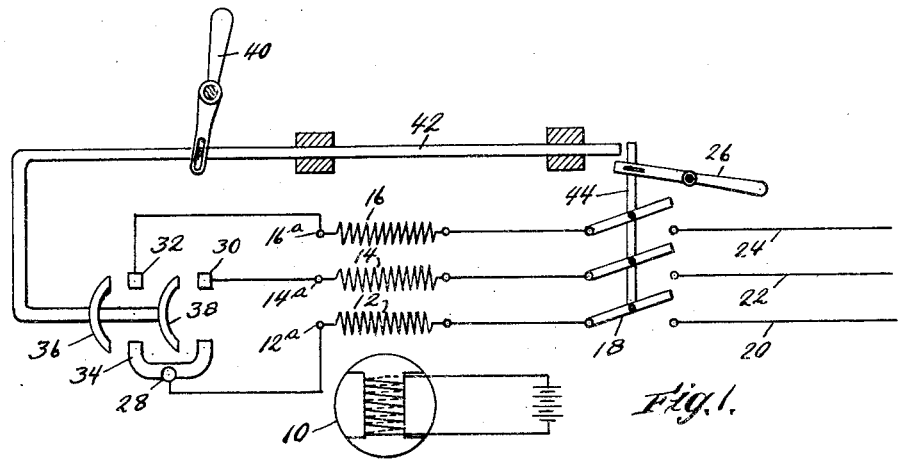
Fig. 1 is a diagrammatic view illustrating the invention applied to a three phase alternating current generating and distributing system.

As shown in Fig. 1, the three phase alternating current generator has the rotating field structure 10 and the three stationary phase windings 12, 14 and 16, respectively, which phase windings are connected through a disconnecting switch 18 with the phase conductors 20, 22 and 24, respectively. The disconnecting switch is adapted to be opened and closed by operating mechanism, herein diagrammatically shown as the pivoted operating handle 26. The disconnecting switch is adapted to be opened only when there is no current in the system and is not adapted to interrupt the current.

Figure 3:
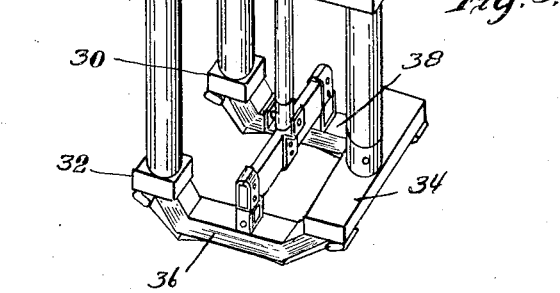
Fig. 3 is a perspective view of an oil immersed circuit breaker used in connection with the system of Fig. 1.

In accordance with this invention, the generator windings are adapted to be star or Y-connected and similar terminals 12a, 14a, 16a thereof are connected respectively to the terminals 28, 30 and 32 of an oil immersed electric switch, the construction of which is illustrated diagrammatically in Fig. 1 and more specifically in Fig. 3. The terminal 28 is provided at its lower end with a fixed conducting bar 34 and movable bridging members 36 and 38 are adapted to connect each of the terminals 32 and 30 with said contact bar 34 thus to interconnect the terminals of the phase windings of the generator in a star or Y-connection.

The operating mechanism of the oil circuit breaker is shown diagrammatically in Fig. 1 as consisting of the pivoted operating handle 40, the free end of which is moved to the left to close the circuit breaker and to the right to open the circuit breaker. The oil circuit breaker preferably is interlocked with the disconnecting switch in such a manner that the disconnecting switch can only be opened after the oil circuit breaker has opened and also so that the oil circuit breaker can not be closed until the disconnecting switch is closed. For this purpose, the interlocking rod 42 of the oil circuit breaker is adapted to be located in a position to ride over the end of the rod 44 of the disconnecting switch and thus be interposed in its path of movement so that when the oil circuit breaker is closed the disconnecting switch can not be opened. When, however, the oil switch is opened the rod 42 will have been moved to the left sufficiently to release the disconnecting switch which thereupon can be opened. When the disconnecting switch is open it is in position to oppose the movement of the rod 42 in the closing direction of the oil circuit breaker.

The location of the oil circuit breaker in control of the connection between the phase windings of the generator results in a material reduction in the work of the breaker in interrupting the power in the generator windings and the phase conductors. Since the generator windings are between the circuit breaker and the phase conductors the reactance of the windings reduces the load on the circuit breaker. Furthermore, the potential between the terminals of the oil circuit breaker at the moment of opening is zero so that the load on the breaker is materially less than would be the case if the breaker were installed between the generator and the phase conductors. While it is true that the voltage across the terminals of the switch rises as the circuit interrupting arcs are elongated yet it is nevertheless true that the average power present in the arcs over the time that they persist is considerably less than would be the case if the switch were located between the generator and the phase conductors. By locating the switch at the interconnection between the phase windings of the generator, the number of switch terminals and consequently the cost of the switch is materially reduced since but three terminals are required as against six terminals for the usual switch for interrupting the power in a three-phase circuit. These are novel features of the invention.

Figure 2:
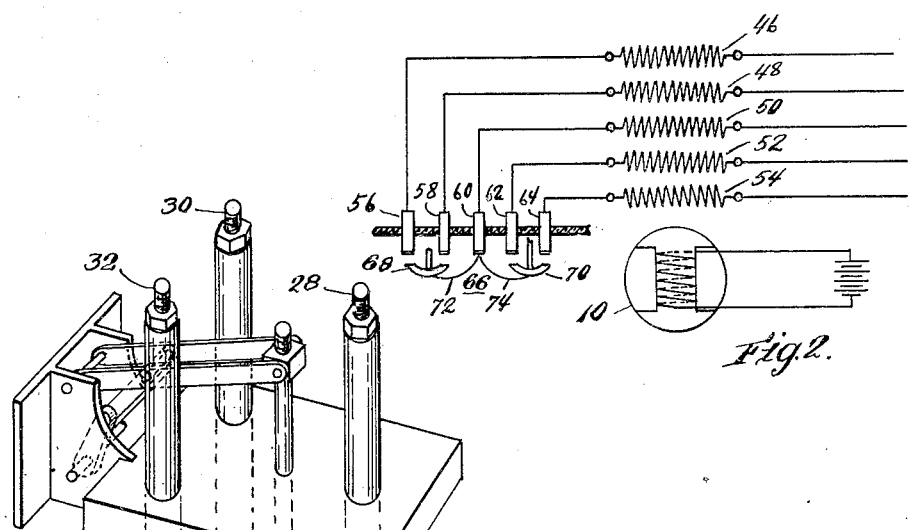
Fig. 2 is a diagram of the invention applied to a five-phase alternating current generating and distributing system.

Fig. 2 represents diagrammatically the application of the invention to a five phase generating and distributing system wherein the similar terminals of the phase windings 46, 48, 50, 52, 54 of the generator are connected respectively to the terminals 56, 58, 60, 62, 64 of the circuit breaker 66. In this switch but two bridging members 68 and 70 are employed and the terminal 60 is connected electrically with said bridging members by the flexible conductors 72 and 74. With this system as with the system of Fig. 1, the number of switch terminals need be no greater than the number of phases.

I claim:

1. An alternating current electric generating and distributing system including the combination of a multi-phase distributing circuit, a multi-phase generator having electrically separate phase windings, a disconnecting switch for connecting similar terminals of said windings each to a separate phase conductor of the circuit, a circuit interrupter for interconnecting the other similar terminals of said windings, means for opening the interrupter to interrupt the current in the windings and in the circuit, and means for preventing the opening of the disconnecting switch until after the circuit interrupter has opened.

2. In an alternating current generating and distributing system having multi-phase conductors and a multi-phase generator provided with electrically-separate phase windings similar terminals of which windings are each connected to a separate phase conductor and other similar terminals are connected to a common junction, the method of controlling the power in the system which consists in opening the common junction between said windings to interrupt the flow of power in the windings and conductors and only thereafter disconnecting the windings from the conductors.

In testimony whereof, I have signed my name to this specification.

GEORGE A. BURNHAM.